US012698727B1

(12) United States Patent
Lefebvre et al.

(10) Patent No.: US 12,698,727 B1
(45) Date of Patent: Aug. 4, 2026

(54) AIRCRAFT ENGINE HAVING SCROLL CASE ASSEMBLY

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA); François Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/251,991

(22) Filed: Jun. 27, 2025

(51) Int. Cl.
  *F01D 25/24*   (2006.01)
  *F02C 3/00*   (2006.01)
(52) U.S. Cl.
  CPC ............... *F01D 25/24* (2013.01); *F02C 3/00* (2013.01); *F05D 2230/237* (2013.01)
(58) Field of Classification Search
  CPC ........ F01D 25/24; F01D 25/30; F01D 25/243; F01D 25/162; F01D 9/026; F02C 3/00; F05D 2230/237
  See application file for complete search history.

(56) References Cited

U.S. PATENT DOCUMENTS 2,469,711 A * 5/1949 Baresch ................ F01D 25/162
                                                          384/441
2,713,990 A * 7/1955 Wosika ................... F01D 25/30
                                                          60/39.5

| | | | |
|---|---|---|---|
| 2,801,518 A | 8/1957 | Wosika et al. | |
| 2,801,519 A | 8/1957 | Wood | |
| 3,993,463 A | 11/1976 | Barr | |
| 4,177,638 A * | 12/1979 | Wood ........................ | F02C 7/06 |
| | | | 60/39.512 |
| 5,186,006 A | 2/1993 | Petty | |
| 7,350,358 B2 | 4/2008 | Patel et al. | |
| 8,757,964 B2 | 6/2014 | Yamashita et al. | |
| 9,057,269 B2 | 6/2015 | Bush | |
| 10,400,617 B2 | 9/2019 | Akiyama et al. | |
| 10,436,069 B2 | 10/2019 | Azuma et al. | |

(Continued)

FOREIGN PATENT DOCUMENTS

| | | |
|---|---|---|
| CN | 103967595 | 8/2014 |
| DE | 102012105897 | 1/2014 |

(Continued)

*Primary Examiner* — Craig Kim
(74) *Attorney, Agent, or Firm* — NORTON ROSE FULBRIGHT CANADA LLP

(57) ABSTRACT

An aircraft engine, has: a combustion engine having an exhaust and drivingly engaged to a load rotatable relative to a central axis; a turbine section engaged with the load; and a scroll case assembly interconnecting the exhaust to the turbine section and having a plurality of sheet metal parts interconnected via braze or weld joints to define a conduit, the sheet metal parts including: a housing extending from a fore end to an aft end; a fore cover having a fore outer periphery secured to the fore end of the housing and a fore inner periphery, an aft cover extending radially from an aft outer periphery secured to the aft end to an aft inner periphery; and vanes distributed around the central axis and located radially between the housing and the fore cover, opposite ends the vanes secured to the radial portion of fore cover and to the aft cover.

20 Claims, 8 Drawing Sheets

(56)                    References Cited

U.S. PATENT DOCUMENTS

| | | | | |
|---|---|---|---|---|
| 10,472,988 | B2 | 11/2019 | Azuma et al. | |
| 10,494,955 | B2 | 12/2019 | Azuma et al. | |
| 10,519,806 | B2 * | 12/2019 | Yokoshima | F01D 25/243 |
| 10,704,420 | B2 * | 7/2020 | Sato | F01D 9/026 |
| 11,035,254 | B2 * | 6/2021 | Azuma | F01D 25/005 |
| 11,293,292 | B2 * | 4/2022 | Smoke | F23R 3/52 |
| 11,732,729 | B2 * | 8/2023 | Balon | F04D 17/00 |
| | | | | 415/203 |
| 11,767,792 | B1 * | 9/2023 | Lefebvre | F01D 9/026 |
| | | | | 415/229 |
| 12,055,091 | B2 | 8/2024 | Miyoshi et al. | |
| 12,065,950 | B1 * | 8/2024 | Lefebvre | F01D 25/24 |
| 12,404,777 | B1 * | 9/2025 | Lefebvre | F01D 25/162 |
| 12,416,249 | B1 * | 9/2025 | Lefebvre | F01D 25/24 |
| 2009/0003998 | A1 * | 1/2009 | Woodcock | F01D 9/026 |
| | | | | 415/205 |
| 2009/0308076 | A1 * | 12/2009 | Nims | F02C 7/32 |
| | | | | 60/751 |

| | | | | |
|---|---|---|---|---|
| 2017/0218760 | A1 * | 8/2017 | Fontaine | F01C 11/008 |
| 2018/0195729 | A1 * | 7/2018 | Smoke | F01D 9/026 |
| 2019/0136717 | A1 * | 5/2019 | Sato | F01D 9/026 |
| 2022/0235793 | A1 * | 7/2022 | Balon | F01D 9/026 |
| 2024/0182178 | A1 * | 6/2024 | Lefebvre | F02C 6/206 |
| 2025/0003354 | A1 * | 1/2025 | Lefebvre | F01D 9/026 |
| 2025/0264037 | A1 * | 8/2025 | Yang | F01D 25/24 |

FOREIGN PATENT DOCUMENTS

| | | | | |
|---|---|---|---|---|
| EP | 3078834 | 10/2016 | | |
| EP | 3211199 | 8/2017 | | |
| EP | 3260670 | 12/2017 | | |
| EP | 4382726 A1 * | 6/2024 | | F02B 41/10 |
| FR | 2824598 A1 * | 11/2002 | | F02C 7/18 |
| GB | 760518 | 10/1956 | | |
| WO | 2015195343 | 12/2015 | | |
| WO | 2017128959 | 8/2017 | | |

* cited by examiner

AIRCRAFT ENGINE HAVING SCROLL CASE ASSEMBLY

TECHNICAL FIELD

The present disclosure relates generally to aircraft engines and, more particularly, to scroll cases used in such engines.

BACKGROUND

In certain engine architectures, aerodynamic flow distributors, such as scroll or volute structures, are used to receive combustion gases and to regulate them in a suitable manner before the combustion gases meet stator vanes or rotor blades of the downstream turbine(s). It may be desired to orient the hot gas flow such that it meets downstream turbine blades at a desired angle. Existing ways to do this are satisfactory for their intended purposes, but improvements are sought.

SUMMARY

In one aspect, there is provided an aircraft engine, comprising: a combustion engine having an exhaust, the combustion engine drivingly engaged to a load rotatable relative to a central axis; a turbine section in driving engagement with the load to compound power with the combustion engine; and a scroll case assembly interconnecting the exhaust of the combustion engine to the turbine section, the scroll case assembly having a plurality of sheet metal parts interconnected to one another via braze or weld joints to define a conduit extending around the central axis from an inlet fluidly connected to the exhaust to an outlet fluidly connected to the turbine section, the sheet metal parts including: a housing defining the inlet and extending axially relative to the central axis from a fore end to an aft end; a fore cover curving from a radial portion to an axial portion relative to the central axis, the radial portion having a fore outer periphery and the axial portion having a fore inner periphery, the fore outer periphery secured to the fore end of the housing; an aft cover extending radially relative to the central axis from an aft outer periphery to an aft inner periphery, the aft outer periphery secured to the aft end of the housing, an outlet of the scroll case defined radially between the fore inner periphery of the fore cover and the aft inner periphery of the aft cover, the housing, the fore cover, and the aft cover conjointly defining a conduit extending around the central axis from the inlet to the outlet; and vanes circumferentially distributed around the central axis and located radially between the housing and the axial portion of the fore cover, opposite ends the vanes secured to the radial portion of fore cover and to the aft cover.

The aircraft engine as defined above and described herein also includes, in certain embodiments, any one or more of the following features, in whole or in part, and in any combination.

In some embodiments, the fore cover defines fore cut-outs and the aft cover defines aft cut-outs, the vanes in register with the fore cut-outs and the aft cut-outs.

In some embodiments, the vanes are hollow.

In some embodiments, the vanes have leading edges and trailing edges, the vanes including fifths braze or weld joints at one or both of the leading edges and the trailing edges.

In some embodiments, the fore cover defines a fore flange at the fore outer periphery, the aft cover defining an aft flange at the aft outer periphery, a first weld or braze joint located radially between the fore flange and the housing, a second weld or braze joint located radially between the aft flange and the housing.

In some embodiments, the fore flange and the aft flange are located radially inwardly of the housing relative to the central axis.

In some embodiments, one or more of the housing, the fore cover, the aft cover, and the vanes are made of sheet metal.

In some embodiments, the aircraft engine includes a coupling secured to the housing via a coupling braze or weld joint, the coupling in register with the inlet, the coupling defining a connecting flange configured to be secured to an exhaust pipe of a combustion engine.

In another aspect, there is provided a scroll case assembly for an aircraft engine, comprising: a housing extending around a central axis and defining an aperture therethrough, the aperture being an inlet for receiving combustion gases, the housing extending axially relative to the central axis from a fore end to an aft end; a fore cover curving from a radial orientation to a axial orientation relative to the central axis from a fore outer periphery to a fore inner periphery, the fore outer periphery secured to the fore end of the housing via a first weld or braze joint; an aft cover extending radially relative to the central axis from an aft outer periphery to an aft inner periphery, the aft outer periphery secured to the aft end of the housing via a second weld or braze joint, an outlet of the scroll case defined radially between the fore inner periphery and the aft inner periphery, the housing, the fore cover, and the aft cover conjointly defining a conduit extending around the central axis from the inlet to the outlet; and vanes circumferentially distributed around the central axis and located radially between the housing and the fore cover, the vanes extending from forward ends to rearward ends, the forward ends secured to the fore cover via third weld or braze joints, the rearward ends secured to the aft cover via fourth weld or braze joints.

The scroll case assembly for an aircraft engine as defined above and described herein also includes, in certain embodiments, any one or more of the following features, in whole or in part, and in any combination.

In some embodiments, the fore cover defines fore cut-outs and the aft cover defines aft cut-outs, the forward ends of the vanes in register with the fore cut-outs, the rearward ends of the vanes in register with the aft cut-outs.

In some embodiments, the vanes are hollow.

In some embodiments, the vanes have leading edges and trailing edges, the vanes including fifths braze or weld joints at one or both of the leading edges and the trailing edges.

In some embodiments, the fore cover defines a fore flange at the fore outer periphery, the aft cover defining an aft flange at the aft outer periphery, the first weld or braze joint located radially between the fore flange and the housing, the second weld or braze joint located radially between the aft flange and the housing.

In some embodiments, the fore flange and the aft flange are located radially inwardly of the housing relative to the central axis.

In some embodiments, one or more of the housing, the fore cover, the aft cover, and the vanes are made of sheet metal.

In some embodiments, the scroll case assembly for an aircraft engine includes a coupling secured to the housing via a coupling braze or weld joint, the coupling in register with the inlet, the coupling defining a connecting flange configured to be secured to an exhaust pipe of a combustion engine.

In yet another aspect, there is provided a method for assembly a scroll case of an aircraft engine, the scroll case configured to receive combustion gases in a generally radial orientation and to expel the combustion gases in a generally axial orientation, comprising: brazing or welding a fore outer periphery of a fore cover to a housing at a fore end thereof; disposing vanes radially between the housing and a portion of the fore cover and brazing or welding the vanes to the fore cover; and brazing or welding an aft cover to both of the vanes and to an aft end of the housing.

The method for assembly a scroll case of an aircraft engine as defined above and described herein also includes, in certain embodiments, any one or more of the following features, in whole or in part, and in any combination.

In some embodiments, the method for assembly a scroll case of an aircraft engine includes perforating the fore cover and the aft cover to define fore cut-outs and aft cut-outs, the vanes in register with the fore cut-outs and the aft cut-outs.

In some embodiments, the method for assembly a scroll case of an aircraft engine includes making the vanes by folding a rectangular strip of sheet metal and by welding or brazing together opposite edges of the rectangular strip.

In some embodiments, the method for assembly a scroll case of an aircraft engine further includes brazing or welding a coupling to the housing and in register with an aperture defined through the housing.

DESCRIPTION OF THE DRAWINGS

Reference is now made to the accompanying Figs. in which.

DETAILED DESCRIPTION

Figure 1:
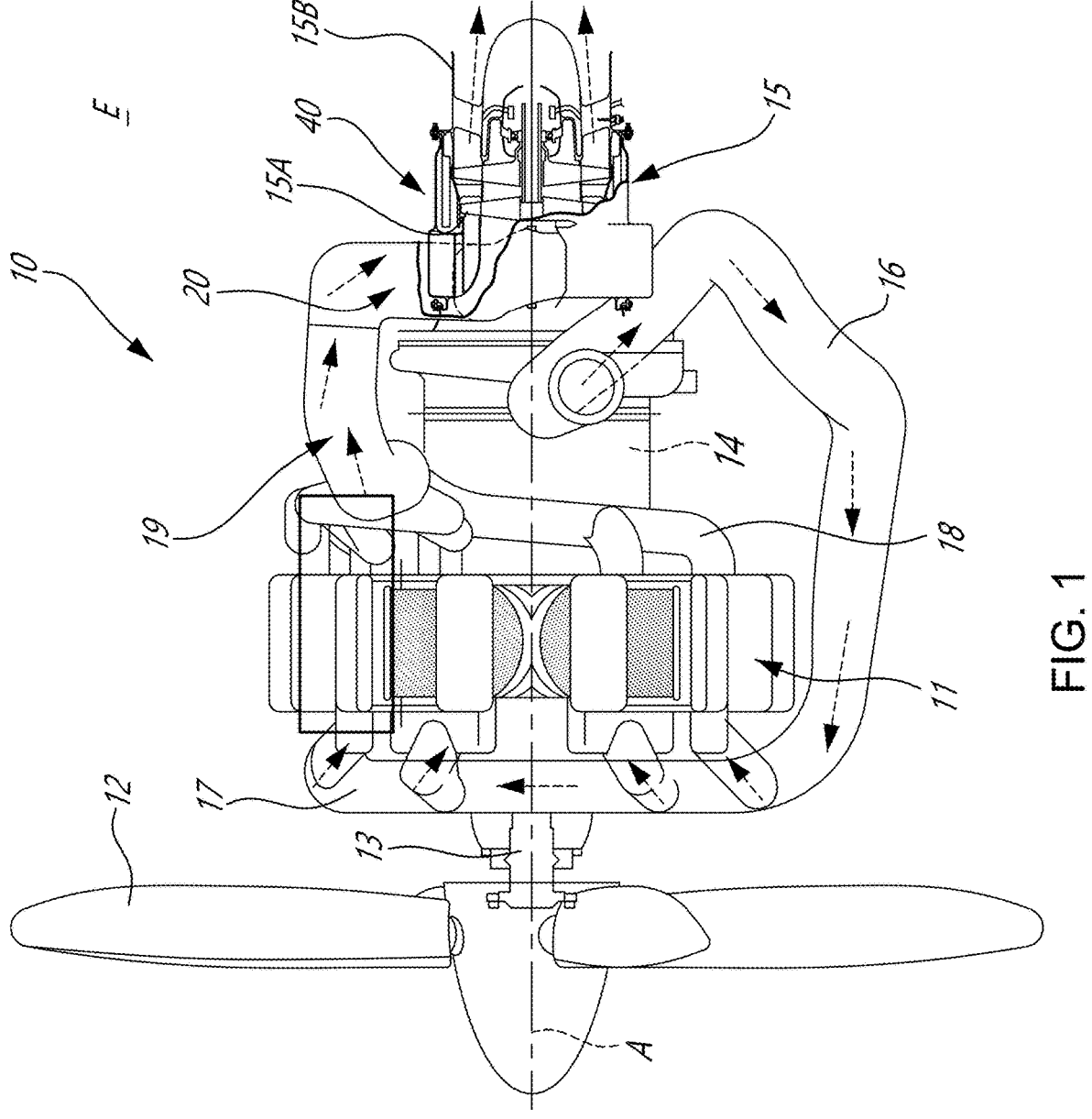
FIG. 1 is a schematic side view of an aircraft engine.

Referring to FIG. 1, an aircraft engine 10 is schematically shown. The aircraft engine 10 comprises a thermal engine module 11 including one or more internal combustion engine(s), drivingly engaged to a rotatable load 12, herein depicted as a propeller, via an output shaft 13. It will be appreciated that the thermal engine module 11 may include any suitable engine, such as a gas turbine engine, a rotary engine, a piston engine, and so on. The output shaft 13 may correspond to an engine shaft of the thermal engine module 11. The thermal engine module 11 may include any engine having at least one combustion chamber of varying volume. For instance, the thermal engine module 11 may comprise one or more piston engine(s) or one or more rotary engine(s) (e.g., Wankel engines).

The aircraft engine 10 further includes a compressor 14 having a compressor inlet receiving ambient air from the environment E outside the aircraft engine 10 and a compressor outlet fluidly connected to an air inlet of the thermal engine module 11. The compressor 14 outputs compressed air from the compressor outlet to the thermal engine module 11 via a compressed air conduit 16 and a manifold 17. The compressed air conduit 16 and the manifold 17 may include any suitable arrangement of pipes configured to distribute compressed air between the different combustion chambers of the thermal engine module 11. Any other suitable configurations used to supply compressed air to the thermal engine module 11 are contemplated without departing from the scope of the present disclosure.

The aircraft engine 10 further includes a turbine 15 having an axially facing turbine inlet 15A (FIG. 2) fluidly connected to an engine outlet of the thermal engine module 11. The turbine 15 has a turbine exhaust case 15B via which combustion gases are expelled to the environment E. The turbine exhaust case 15B may include a tailpipe or any other suitable structures (e.g., exhaust mixer) for discharging the combustion gases from the aircraft engine 10. In some embodiments, the aircraft engine 10 may be a hybrid engine including an electric motor drivingly engaged to the output shaft 13 to assist the thermal engine module 11 in driving the output shaft 13 and the rotatable load 12 (e.g., propeller 12) mounted thereto.

Figure 2:
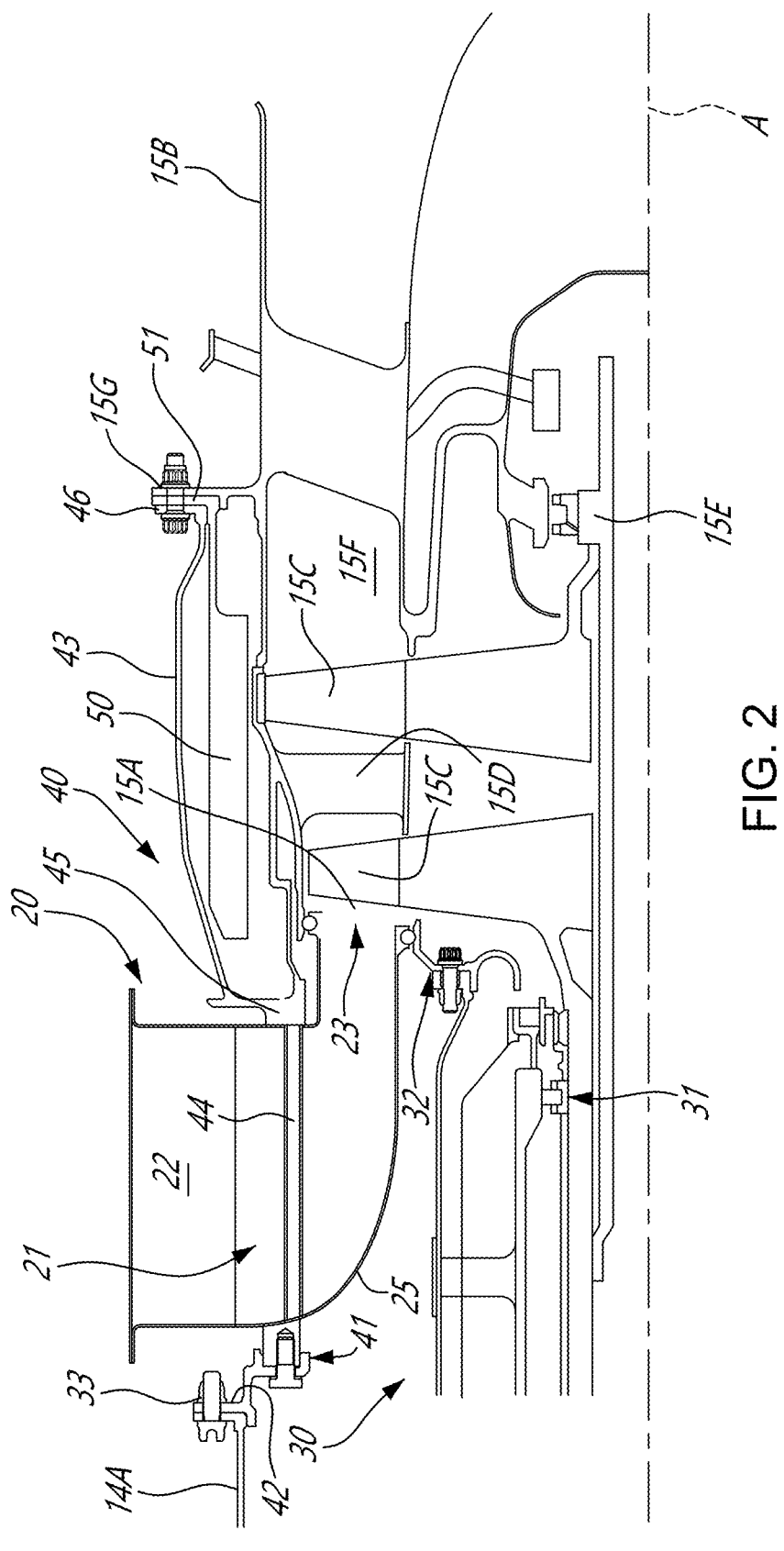
FIG. 2 is a side cross-sectional view of a portion of the aircraft engine of FIG. 1 illustrating a hot section of the aircraft engine including a scroll case.

Referring jointly to FIGS. 1-2, in one or more embodiment(s), the turbine 15 includes an axial turbine having successive rows of rotor(s) 15C and stator(s) 15D disposed in alternation along a central axis A of the aircraft engine 10. The rotor(s) 15C may include rotor blades mounted to rotor discs. The stator(s) 15D may include stator vanes secured at opposite ends to inner and outer shrouds. In other words, the turbine 15 may include a plurality of stages each including a stator and a rotor. The rotors 15C of the turbine 15 are in driving engagement with a turbine shaft 15E. The turbine shaft 15E may be drivingly engaged to the output shaft 13, which may correspond to the engine shaft of the thermal engine module 11. Therefore, the turbine 15 may compound power with the thermal engine module 11 to drive the rotatable load 12. In other words, the turbine shaft 15E may be drivingly engaged to the engine shaft of the thermal engine module 11 via suitable gearing. In the embodiment shown, the turbine shaft 15E is drivingly engaged to a compressor shaft of the compressor 14. Thus, the turbine 15 may drive both the rotatable load 12 and the compressor 14. In the exemplified embodiment, the engine shaft of the thermal engine module 11, the output shaft 13, and the turbine shaft 15E are all coaxial about the central axis A. However, in other configurations, the turbine 15 and/or the compressor 14 may have respective shafts radially offset from one another relative to the central axis A.

As shown in FIG. 1, the engine outlet of the thermal engine module 11 is fluidly connected to an exhaust manifold 18 that receives combustion gases outputted by the combustion chambers or by a combustor of the thermal engine module 11. The exhaust manifold 18 collects the combustion gases from the different combustion chambers and flows these combustion gases to a combustion engine exhaust pipe 19 that feeds the combustion gases to the turbine 15. In other words, the engine outlet of the thermal engine module 11 is fluidly connected to the turbine inlet 15A via the exhaust manifold 18 and the combustion engine exhaust pipe 19. Any other suitable configurations used to supply combustion gases to the turbine 15 are contemplated without departing from the scope of the present disclosure.

As schematically depicted by the flow arrows in FIG. 1, the combustion gases are flowing within the combustion engine exhaust pipe 19 and reach the turbine 15 in a direction being mainly radial relative to the central axis A and which may include a circumferential component relative to the central axis A. However, the turbine 15 includes an axial turbine and therefore the turbine inlet 15A receives the combustion gases along a direction being mainly axial relative to the central axis A. To redirect the combustion gases from a direction being mainly radial to a direction being mainly axial, that is, to decrease a radial component of a direction of the combustion gases, the aircraft engine 10 further includes a scroll case 20 that regulates and reorients the combustion gases so that they meet an upstream most of the stages of the turbine 15 at the most appropriate angle of attack. The scroll case 20 may therefore be used to adequately orient the combustion gases at the most appropriate angle to meet upstream-most airfoils of the turbine 15.

Still referring to FIG. 2, as shown in the exemplified embodiment, the scroll case 20 includes a conduit 21 extending around the central axis A from an inlet 22 to an outlet 23. The inlet 22 is fluidly connected to the combustion engine exhaust pipe 19 (FIG. 1), whereas the outlet 23 is fluidly connected to the turbine inlet 15A of the turbine 15. According to the illustrated embodiment, the inlet 22 of the conduit 21 has a tangential component and the outlet 23 is an annular outlet facing axially in a rearward direction and in alignment with an annular gas path 15F of the turbine 15. This configuration allows injecting the combustion gases in a direction being mainly axial relative to the central axis A to meet the axial inlet of the turbine 15. Vanes 24 (FIG. 5) may be provided in the conduit 21 to direct and regulate the flow of combustion gases. The vanes 24 may be omitted in some embodiments. The conduit 21 of the scroll case 20 is in this embodiment disposed axially forwardly of the turbine 15.

The conduit 21 comprises a non-axisymmetric portion extending downstream from the inlet 22 and spiraling towards the central axis A. As it progresses circumferentially around the central axis A, the non-axisymmetric portion of the conduit 21 transitions or merges with an axisymmetric portion, which forms a 360 degrees axisymmetric structure around the central axis A. The axisymmetric portion extends downstream from the non-axisymmetric portion to the outlet 23.

As illustrated on FIG. 2, a compressor case 14A of the compressor 14 is radially supported by a bearing housing 30. It will be appreciated that that any suitable support structure may be used for support the compressor case 14A. For instance, the support structure may be any static component of the engine, such as a support flange and so on. Bearings 31 are rollingly engaged to the bearing housing 30 and radially support a shaft of the engine. The scroll case 20 is secured to a rear end 32 of the bearing housing 30. In the exemplified embodiment, the scroll case 20 has a radially-inner wall 25 that defines a flange at its rear end. The flange of the radially-inner wall 25 is received within an annular groove defined by the rear end 32 of the bearing housing 30. Other configurations are however contemplated. Therefore, the scroll case 20 may not rely on the turbine exhaust case 15B for structural support.

In the disclosed embodiment, a turbine support case 40 is used to secure the turbine exhaust case 15B to the compressor case 14A of the compressor 14. As will be explained below, the turbine support case 40 is independent from the scroll case 20 such that thermal growth of the scroll case 20 may not be transmitted to the turbine exhaust case 15B. Therefore, the turbine exhaust case 15B is secured to the compressor case 14A via the turbine support case 40 independently of the scroll case 20. In the present disclosure, the expression "independent" or "independently" in "independently of the scroll case 20" implies that a load path extends from the compressor case 14A to the turbine exhaust case 15B through the turbine support case 40 without intersecting the scroll case 20. The scroll case 20 is therefore free from intersection to the load path from the compressor case 14A to the turbine exhaust case 15B. The scroll case 20 is thus not part of the load path from the compressor case 14A to the turbine exhaust case 15B and loads generated by the turbine 15 on the turbine exhaust case 15B are transmitted to the compressor case via the turbine support case 40 without assistance from the scroll case 20. The scroll case 20 is thus outside the load path that extends through the turbine support case 40. The scroll case 20 may thus be structurally floating relative to the turbine support case 40.

The turbine support case 40 has a portion that axially overlaps the scroll case 20 and is secured to an annular member 41, which is itself secured to the bearing housing 30 or any other suitable support structure. More specifically, the annular member 41 has a flange 42 secured (e.g., bolted) to a first flange 33 of the bearing housing 30. The bearing housing 30 further has a second flange 34, which may be disposed radially outwardly of the first flange 33 and axially offset from the first flange 33, for being secured (e.g., bolted) to a mating flange of the compressor case 14A.

The turbine support case 40 includes a wall 43 extending around the central axis A. The wall 43 may be cylindrical, frustoconical, or any other suitable shape. The wall 43 may extend a full circumference around the central axis A. The turbine support case 40 further includes spokes 44 protruding from the wall 43. More specifically, the turbine support case 40 includes an annular axial wall 45 extending radially inwardly from the wall 43. The spokes 44 protrude in a direction having an axial component relative to the central axis A from the annular axial wall 45 and away from the wall 43. The spokes 44 may be parallel to the central axis A. An annular flange 46 is provided at a rear end of the wall 43 and is secured (e.g., bolted) to a mating flange 15G (FIG. 3) of the turbine exhaust case 15B.

The wall 43 axially overlaps at least a portion of the turbine 15. A containment ring 50 may be secured to the flange 15G of the turbine exhaust case 15B via containment ring flange 51, which may be sandwiched between the annular flange 46 of the turbine support case 40 and the flange 15G of the turbine exhaust case 15B. The containment ring 50 is, in this embodiment, disposed radially between the wall 43 of the turbine support case 40 and at least one of the rotors 15C of the turbine 15.

The spokes 44, six in the illustrated embodiment, but more or less may be used, extend from proximal ends at the annular axial wall 45 to distal ends. The distal ends of the spokes 44 are secured to the annular member 41. In some embodiments, the distal ends of the spokes may define threaded apertures threadingly engageable by fasteners (e.g., bolts) extending through correspondingly-shaped apertures defined through the annular member 41 and threadingly engaged to the threaded apertures for securing the spokes 44 to the annular member 41, which is itself secured to the bearing housing 30.

In the embodiment shown, each of the spokes 44 is received within a respective one of the vanes 24, which are hollow, of the scroll case 20. The spokes 44 therefore axially overlap the vanes 24. Thus, the spokes 44 may be isolated from combustion gases flowing through the scroll case 20 by the vanes 24. The spokes 44 may be free of connection to the vanes 24. In other words, outer surfaces of the spokes 44 may be free of contact with inner surfaces of the vanes 24. An annular gap may be provided between the inner surface of each vanes 24 and the associated spokes 44 extending internally therethrough. The vanes 24 may move axially, radially, and/or circumferentially relative to the spokes 44 without transferring any forces to the spokes 44, and vice versa. Put differently, the scroll case 20 is free from direct connection to the turbine support case 40. In other words, the scroll case 20 is free of contact, attachment, so on with the turbine support case 40. The spokes 44 of this embodiment have an elongated, airfoil-like shape to substantially match a shape of the vanes 24. However, the shape of the spokes 44 may be different. The spokes 44 may be circular, oval, square, rectangular in cross-section and so on, without departing from the scope of the present disclosure.

The scroll case 20 disclosed herein may be made from sheet metal to improve the weight of the part. Scroll cases may be used in compressor sections where pressure is substantially higher than in turbine sections. Inventors of the instant disclosure found that the lower pressure in the scroll case 20 allows its manufacture from sheet metal, where the wall thicknesses are substantially less than a casted counter part used in a compressor. By producing a sheet-metal scroll case, a considerable weight saving may be obtained. Hence, the disclosed scroll case 20, made with an assembly of sheet metal parts, may considerably reduce the weight of this part compared to the casted counterpart. Thickness of the sheet metal is reduced compared to thickness of walls of the casted counterpart. Manufacturing costs may also be reduced.

Figures 3, 4:
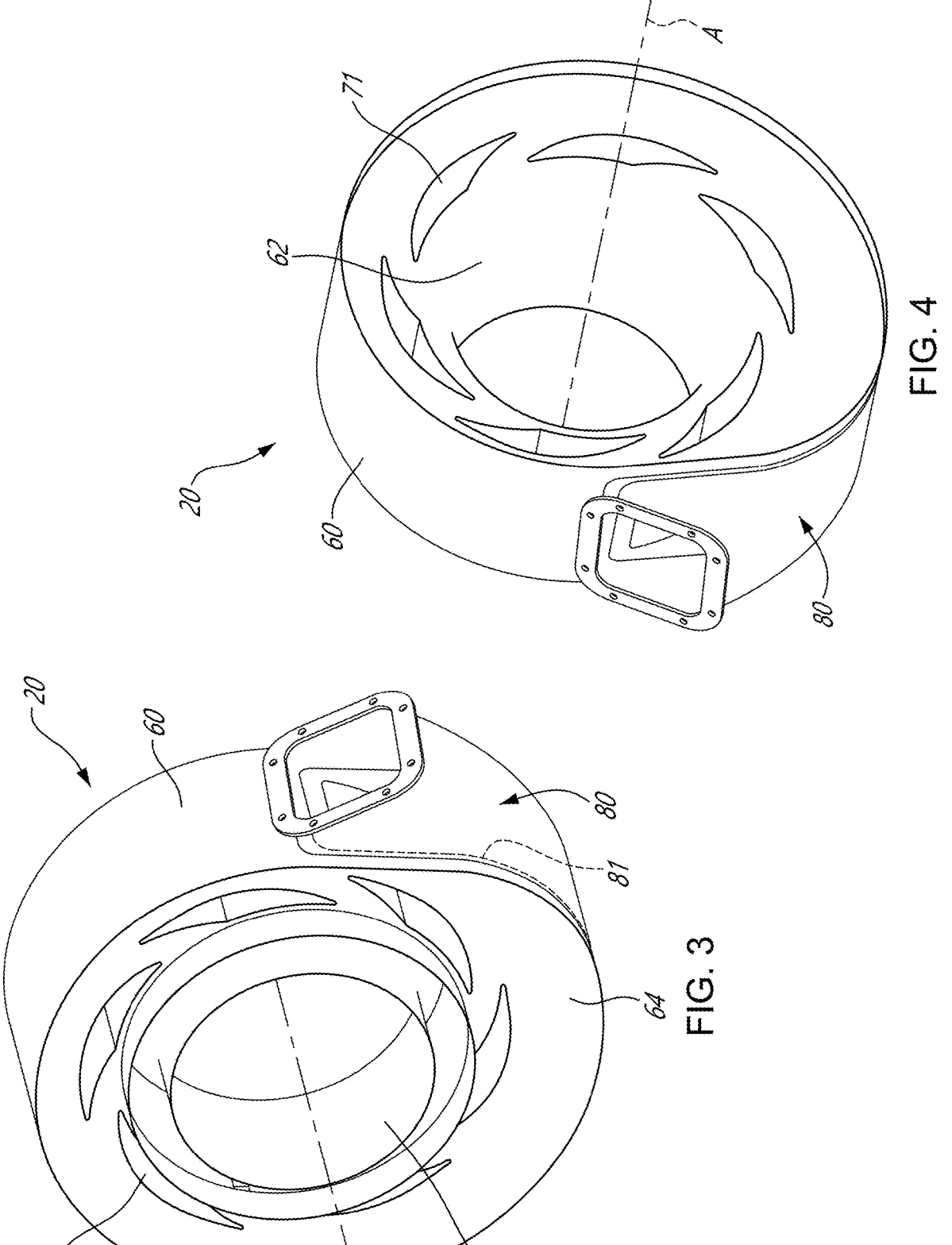
FIG. 3 is a first three-dimensional view of the scroll case of FIG. 2.
FIG. 4 is another three-dimensional view of the scroll case of FIG. 2.
Figure 5:
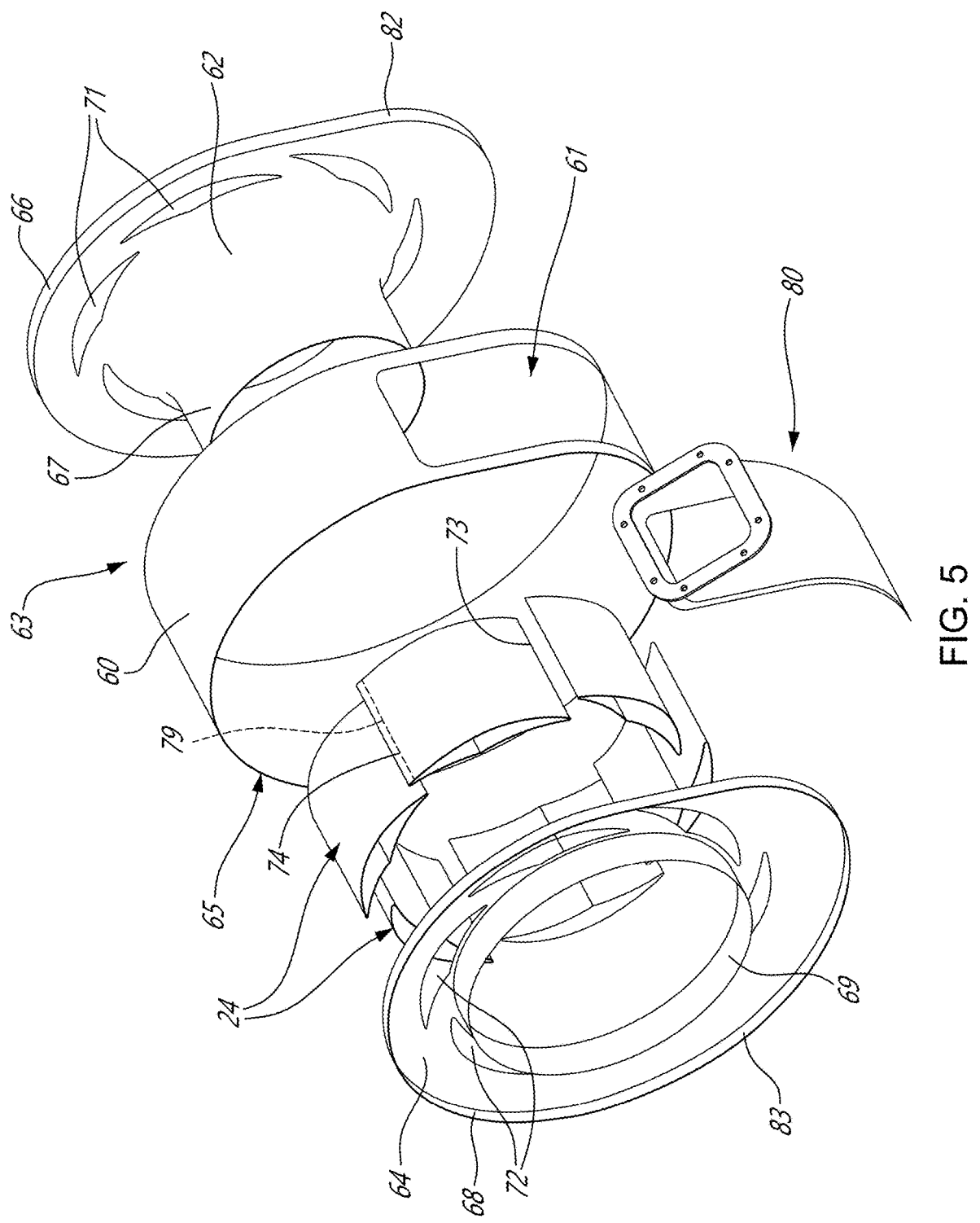
FIG. 5 is a three-dimensional exploded view of the scroll case of FIG. 2, illustrating the different parts that constitute the scroll case.

Referring to FIGS. 3-5, the scroll case 20 is described in more detail. In the embodiment shown, the scroll case 20 includes a plurality of sheet metal parts that are interconnected to one another via braze or weld joints to define the conduit 21 that extends around the central axis A. In the depicted embodiment, these interconnected metal parts include a housing 60 that extends around the central axis A and that defines an aperture 61 therethrough. The aperture 61 corresponds to the inlet 22 that is fluidly connected to the thermal engine module 11 for receiving the combustion gases. As illustrated, the housing 60 extends axially relative to the central axis A, from a fore end 63 to an aft end 65. The housing 60 may extend fully around the central axis A and may be the radially outer-most part of the scroll case 20.

It will be appreciated that, in the context of the present disclosure, a radial direction implies a mainly radial direction, and an axial direction implies a mainly axial direction. In the context of the present disclosure, the expression "mainly" as in "mainly axial" implies that a main component of a direction is in the axial direction. For instance, "mainly axially" implies that the greatest component of the direction is in the axial direction relative to the central axis, A.

The parts further include a fore cover 62 that curves from a radial orientation to an axial orientation relative to the central axis A from a fore outer periphery 66 to a fore inner periphery 67. Put differently, the fore cover 62 curves from a radial portion to an axial portion relative to the central axis A. The radial portion has the fore outer periphery 66 and the axial portion having the fore inner periphery 67. The fore outer periphery 66 is secured to the fore end 63 of the housing 60. As illustrated in FIG. 5, the fore inner periphery 67 is located radially inwardly and axially-rearward of the fore outer periphery 66. As shown in FIG. 5, the fore cover 62 may be the part that is responsible for redirecting the combustion gases from a radial orientation at the inlet 22 to a axial orientation at the outlet 23 of the scroll case 20.

The scroll case 20 further includes an aft cover 64 that extends radially relative to the central axis A, from an aft outer periphery 68 to an aft inner periphery 69. The outlet 23 of the scroll case 20 is defined radially between the aft inner periphery 69 of the aft cover 64 and the fore inner periphery 67 of the fore cover 62. The housing 60, the fore cover 62, and the aft cover 64 conjointly define the conduit 21 of the scroll case 20. This conduit 21 extends around the central axis A from the inlet 22 to the outlet 23.

In the depicted embodiment, the scroll case 20 includes the vanes 24 that are each a separate, distinct part, which may be made of sheet metal. The vanes 24 are thus circumferentially distributed around the central axis A and are located radially between the housing 60 and a portion of the fore cover 62. This portion corresponds to a cylindrical portion that leads to the fore inner periphery 67 of the fore cover 62. The vanes 70 each extend from a forward end to a rearward end. As shown more clearly in FIG. 5 and as explained above, the vanes 70 are hollow and sized to receive therethrough the spokes 44 that are used to interconnect the turbine exhaust case 15B to the compressor case 14A of the aircraft engine 10.

Hence, to accommodate those spokes 44, the fore cover 62 defines fore cut-outs 71, and the aft cover 64 defines aft cut-outs 72. Each of the vanes 70 is in register with a respective one of the fore cut-outs 71 and with a respective one of the aft cut-outs 72. It will however be appreciated that, in other configurations, the cut-outs may be omitted.

In the depicted environment, each of the vanes 70 has a leading edge 73 and a trailing edge 74. The vanes 70 may be manufactured using one or more substantially rectangular piece of sheet metal that is bent to define the desired shape as discussed below.

Since all of those parts are made of sheet metal, the present disclosure uses braze or weld joints to interconnect the different parts of the scroll case 20 together. More specifically, and referring to FIG. 6, the fore cover 62 may be secured to the housing 60 via a first weld or braze joint 75 defined between the fore outer periphery 66 and the fore end 63 of the housing 60. Then, the aft cover 64 may also be secured to the housing 60 via a second weld or braze joint 76 that is defined between the aft outer periphery 68 and the aft end 65 of the housing 60. The vanes 24 may thus be secured at their respective forward and reward ends to both of the fore cover 62 and the aft cover 64. More specifically, the forward ends of the vanes 24 are secured to the fore cover 62 via third weld or braze joints 77. The reward ends of the vanes 24 are secured to the aft cover 64 via fourth weld or braze joints 78.

In the depicted embodiment, the vanes 24 may include fifth weld or braze joints 79 (FIG. 5) at one of the leading edges 73 and the trailing edges 74. It will be appreciated that weld joints may be located at other locations on the vanes 24, for instance, at one or more of the pressure and suction side, without departing from the scope of the present disclosure. Also, the vanes 24 may each include more than one joint, for instance, at both of the leading and trailing edges 73, 74.

As shown in FIG. 5, the scroll case 20 may further include a coupling 80 that is secured to the housing 60 via a coupling braze or weld joint 81 (FIG. 3). The coupling 80 is in register with the inlet 22. It defines a connecting flange that is configured to be secured to the exhaust pipe 19 of the thermal engine module 11.

Figure 6:
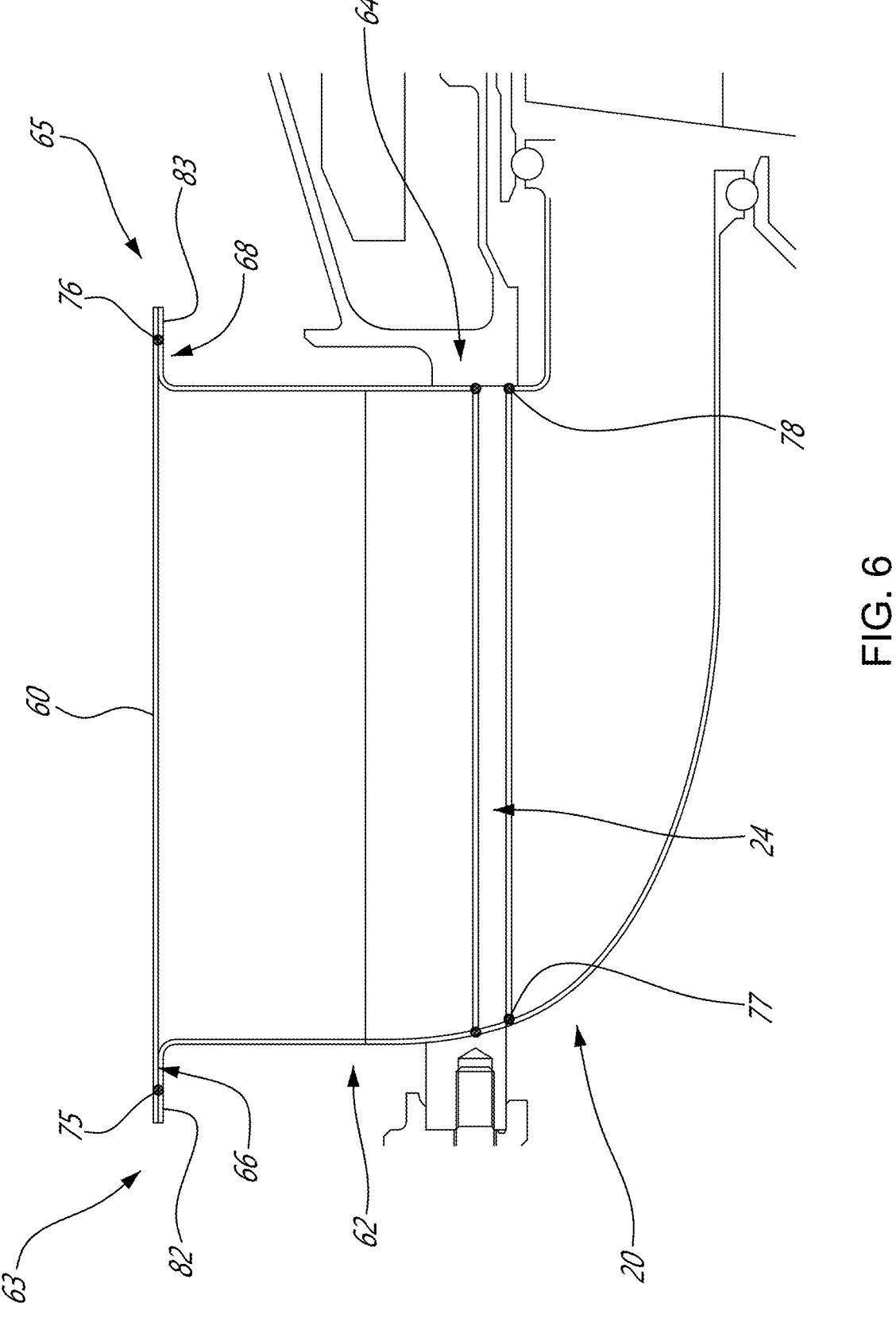
FIG. 6 is a cross-sectional view of the scroll case of FIG. 5.

Referring to FIG. 6, in one possible embodiment, the housing 60 may be secured to the fore cover 62 and the aft cover 64 via mating flanges. For instance, the fore cover 62 may include a fore flange 82 and the aft cover 64 may include an aft flange 83. The fore flange 82 is located at the fore outer periphery 66, whereas the aft flange 83 is located at the aft outer periphery 68. The first weld or braze joint 75 may be located radially between the fore flange 82 and the housing 60, whereas the second weld or braze joint 76 may be located radially between the aft flange 83 and the housing 60. In this embodiment, the fore flange 82 and the aft flange 83 are both located radially inwardly of the housing 60, relative to the central axis A. However, it would be appreciated that the opposite may be true.

Figure 7:
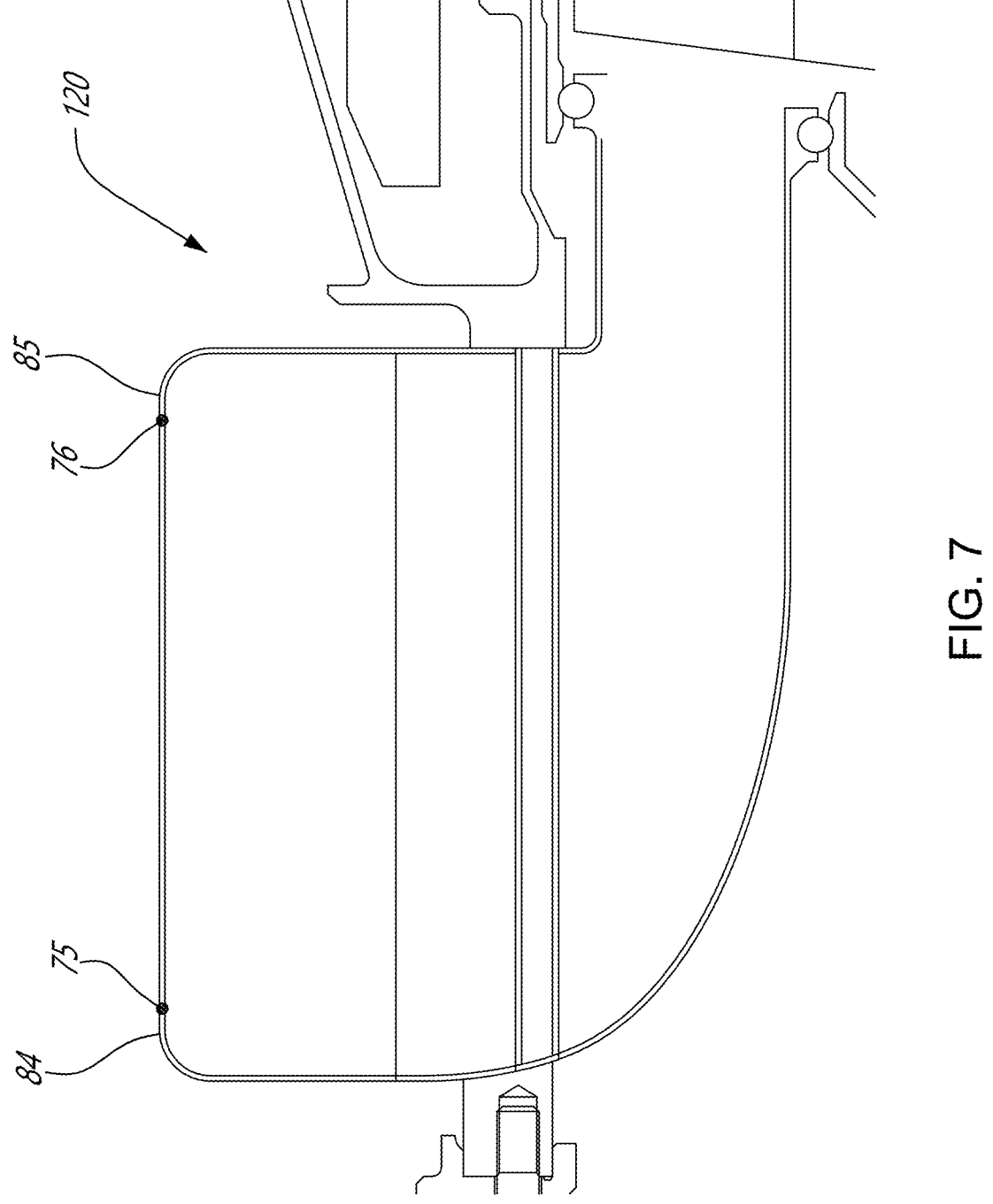
FIG. 7 is a cross-sectional view of the scroll case in accordance with another embodiment.

Referring now to FIG. 7, a scroll case in accordance with another embodiment is shown at 120. Other ways of securing the different parts is illustrated. Instead of having mating flanges as for the configuration of FIG. 6, the fore cover 62 and the aft cover 64 may meet the housing 60 using a butt weld configuration. That is, the fore cover 62 and the aft cover 64 may each define a fore outer flange 84 at the fore outer periphery 66 and an aft outer flange 85 at the aft outer periphery 68; the flanges extending axially towards one another. The housing 60 is defined between these flanges and the first and second weld or braze joints 75, 76 are located at intersections between mating edges of the housing 60 and of the flanges.

Figure 8:
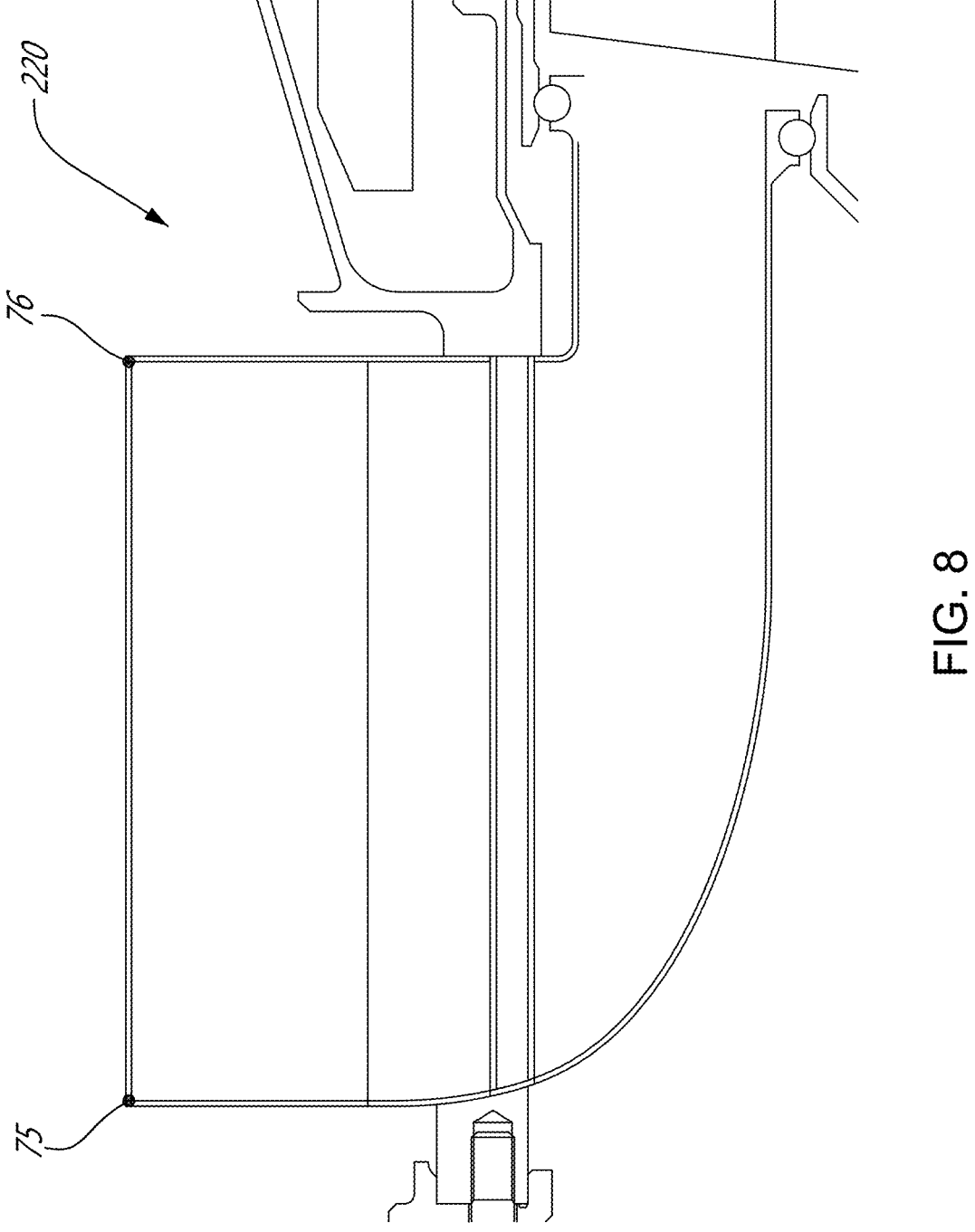
FIG. 8 is a cross-sectional view of the scroll case in accordance with yet another embodiment.

Referring now to FIG. 8, a scroll case in accordance with another embodiment is shown at 220. In this embodiment, fillet welds may be used to join the fore cover 62 to the housing 60, and the aft cover 64 to the housing 60. More specifically, the first and second braze or weld joints 75, 76 are located at intersections between the housing 60 and the fore and aft covers 62, 64.

More specifically, the first and second weld or braze joints 75, 76 define corners of the scroll case 220.

Figure 9:
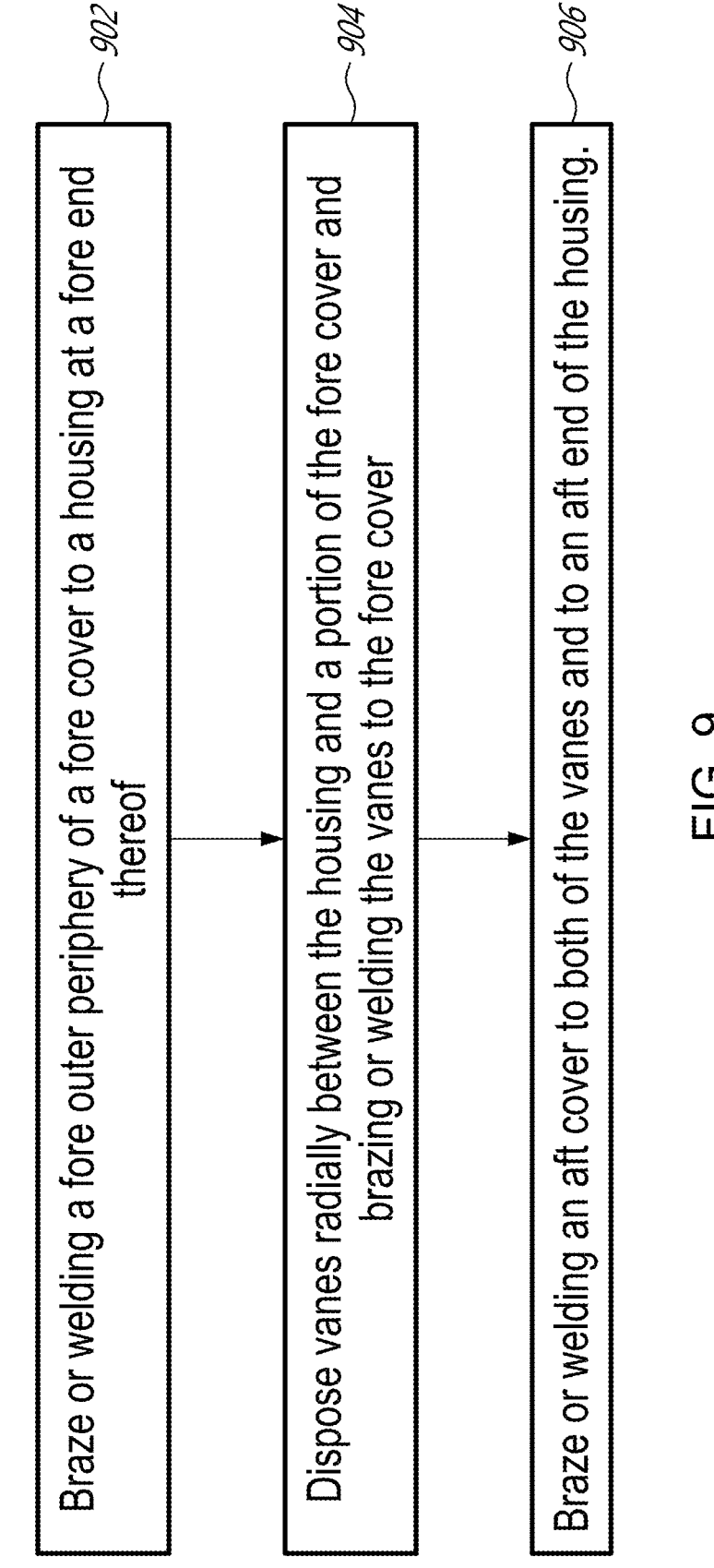
FIG. 9 is a flowchart illustrating steps of a method for assembling a scroll case of an aircraft engine.

Referring to FIG. 9, a method for assembly the scroll case 20 is shown at 900. The method 900 includes brazing or welding the fore outer periphery of he fore cover to the housing at the fore end thereof at 902; disposing the vanes radially between the housing and a portion of the fore cover and brazing or welding the vanes to the fore cover at 904; and brazing or welding the aft cover to both of the vanes and to the aft end of the housing at 906.

The method 900 may further include perforating the fore cover and the aft cover to define the fore cut-outs and the aft cut-outs. The vanes in register with the fore cut-outs and the aft cut-outs. The method 900 may include making the vanes 24 by folding a rectangular strip of sheet metal and by welding or brazing together opposite edges of the rectangular strip. In some embodiments, the method 900 includes brazing or welding the coupling to the housing and in register with an aperture defined through the housing.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
   a combustion engine having an exhaust, the combustion engine drivingly engaged to a load rotatable relative to a central axis;
   a turbine section in driving engagement with the load to compound power with the combustion engine; and
   a scroll case assembly interconnecting the exhaust of the combustion engine to the turbine section, the scroll case assembly having a plurality of sheet metal parts interconnected to one another via braze or weld joints to define a conduit extending around the central axis from an inlet fluidly connected to the exhaust to an outlet fluidly connected to the turbine section, the sheet metal parts including:

US 12,698,727 B1

11                                                                 12 a housing defining the inlet and extending axially relative to the central axis from a fore end to an aft end;

a fore cover curving from a radial portion to an axial portion relative to the central axis, the radial portion having a fore outer periphery and the axial portion having a fore inner periphery, the fore outer periphery secured to the fore end of the housing;

an aft cover extending radially relative to the central axis from an aft outer periphery to an aft inner periphery, the aft outer periphery secured to the aft end of the housing, an outlet of the scroll case defined radially between the fore inner periphery of the fore cover and the aft inner periphery of the aft cover, the housing, the fore cover, and the aft cover conjointly defining a conduit extending around the central axis from the inlet to the outlet; and vanes circumferentially distributed around the central axis and located radially between the housing and the axial portion of the fore cover, opposite ends the vanes secured to the radial portion of fore cover and to the aft cover.

2. The aircraft engine of claim 1, wherein the fore cover defines fore cut-outs and the aft cover defines aft cut-outs, the vanes in register with the fore cut-outs and the aft cut-outs.

3. The aircraft engine of claim 2, wherein the vanes are hollow.

4. The aircraft engine of claim 3, wherein the vanes have leading edges and trailing edges, the vanes including fifths braze or weld joints at one or both of the leading edges and the trailing edges.

5. The aircraft engine of claim 1, wherein the fore cover defines a fore flange at the fore outer periphery, the aft cover defining an aft flange at the aft outer periphery, a first weld or braze joint located radially between the fore flange and the housing, a second weld or braze joint located radially between the aft flange and the housing.

6. The aircraft engine of claim 5, wherein the fore flange and the aft flange are located radially inwardly of the housing relative to the central axis.

7. The aircraft engine of claim 1, wherein one or more of the housing, the fore cover, the aft cover, and the vanes are made of sheet metal.

8. The aircraft engine of claim 1, comprising a coupling secured to the housing via a coupling braze or weld joint, the coupling in register with the inlet, the coupling defining a connecting flange configured to be secured to an exhaust pipe of a combustion engine.

9. A scroll case assembly for an aircraft engine, comprising:

a housing extending around a central axis and defining an aperture therethrough, the aperture being an inlet for receiving combustion gases, the housing extending axially relative to the central axis from a fore end to an aft end;

a fore cover curving from a radial orientation to a axial orientation relative to the central axis from a fore outer periphery to a fore inner periphery, the fore outer periphery secured to the fore end of the housing via a first weld or braze joint;

an aft cover extending radially relative to the central axis from an aft outer periphery to an aft inner periphery, the aft outer periphery secured to the aft end of the housing via a second weld or braze joint, an outlet of the scroll case defined radially between the fore inner periphery and the aft inner periphery, the housing, the fore cover, and the aft cover conjointly defining a conduit extending around the central axis from the inlet to the outlet; and vanes circumferentially distributed around the central axis and located radially between the housing and the fore cover, the vanes extending from forward ends to rearward ends, the forward ends secured to the fore cover via third weld or braze joints, the rearward ends secured to the aft cover via fourth weld or braze joints.

10. The scroll case of claim 9, wherein the fore cover defines fore cut-outs and the aft cover defines aft cut-outs, the forward ends of the vanes in register with the fore cut-outs, the rearward ends of the vanes in register with the aft cut-outs.

11. The scroll case of claim 10, wherein the vanes are hollow.

12. The scroll case of claim 11, wherein the vanes have leading edges and trailing edges, the vanes including fifths braze or weld joints at one or both of the leading edges and the trailing edges.

13. The scroll case of claim 9, wherein the fore cover defines a fore flange at the fore outer periphery, the aft cover defining an aft flange at the aft outer periphery, the first weld or braze joint located radially between the fore flange and the housing, the second weld or braze joint located radially between the aft flange and the housing.

14. The scroll case of claim 13, wherein the fore flange and the aft flange are located radially inwardly of the housing relative to the central axis.

15. The scroll case of claim 1, wherein one or more of the housing, the fore cover, the aft cover, and the vanes are made of sheet metal.

16. The scroll case of claim 9, comprising a coupling secured to the housing via a coupling braze or weld joint, the coupling in register with the inlet, the coupling defining a connecting flange configured to be secured to an exhaust pipe of a combustion engine.

17. A method for assembly a scroll case of an aircraft engine, the scroll case configured to receive combustion gases in a generally radial orientation and to expel the combustion gases in a generally axial orientation, comprising:

brazing or welding a fore outer periphery of a fore cover to a housing at a fore end thereof;

disposing vanes radially between the housing and a portion of the fore cover and brazing or welding the vanes to the fore cover; and brazing or welding an aft cover to both of the vanes and to an aft end of the housing.

18. The method of claim 17, comprising perforating the fore cover and the aft cover to define fore cut-outs and aft cut-outs, the vanes in register with the fore cut-outs and the aft cut-outs.

19. The method of claim 17, comprising making the vanes by folding a rectangular strip of sheet metal and by welding or brazing together opposite edges of the rectangular strip.

20. The method of claim 17, further comprising brazing or welding a coupling to the housing and in register with an aperture defined through the housing.

* * * * *